Dec. 30, 1947.  R. G. TAHON  2,433,407
SYSTEM OF MODULATION TRANSMISSION BY MEANS OF IMPULSES
Filed July 2, 1943  2 Sheets-Sheet 2
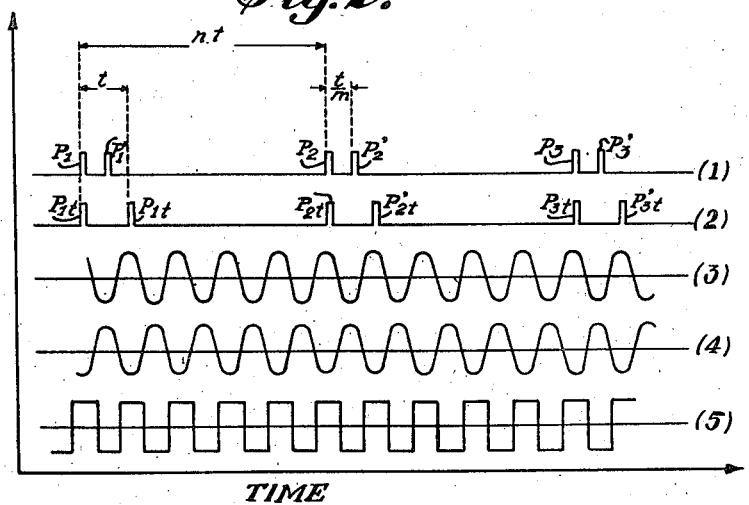
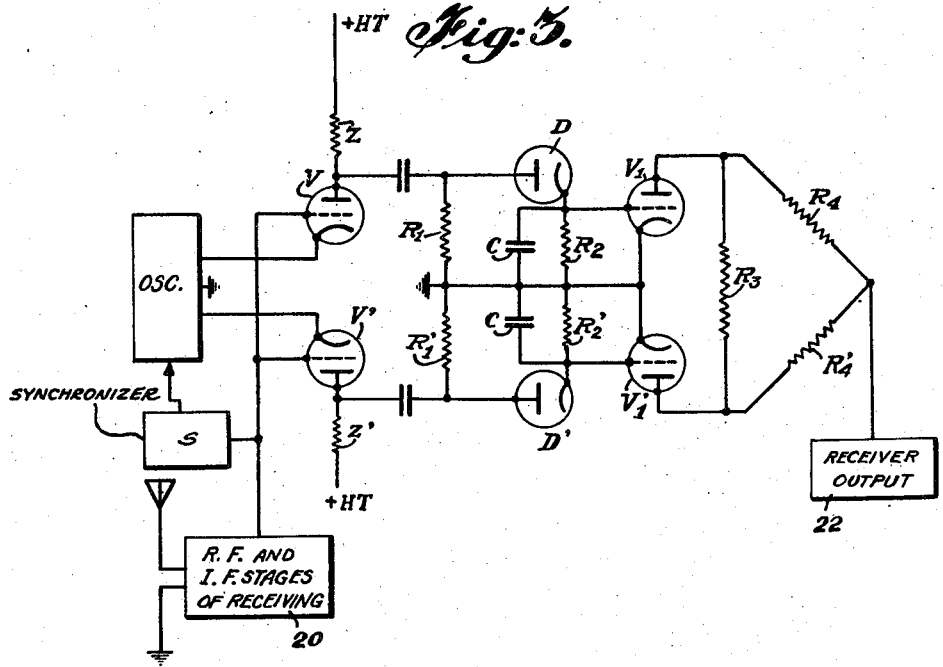
INVENTOR.
ROBERT G. TAHON
BY
AGENT Patented Dec. 30, 1947

2,433,407

UNITED STATES PATENT OFFICE 2,433,407

SYSTEM OF MODULATION TRANSMISSION BY MEANS OF IMPULSES

Robert G. Tahon, Lyon, France, assignor to International Standard Electric Corporation, New York, N. Y., a corporation of Delaware Application July 2, 1943, Serial No. 493,282
In France April 4, 1940

8 Claims. (Cl. 250—6)

The present invention relates to systems of modulation transmission by means of impulses.

One of the objects of the invention is to provide impulse modulation transmission systems which are as independent as possible of interferences of all kinds, including the intentional jumbling of the signals, while obtaining the advantages of the use of impulse modulation, particularly for the purpose of providing communications having a high degree of secrecy.

It is well known that, all other things being equal, the use of impulse modulation permits the obtaining of signals having a high momentary amplitude value. Another advantage of this kind of modulation results from the discontinuity of the emission, i. e. for a signal that persists for a given time, the transmission path is utilized for only a few relatively short moments.

As the emission does not occupy the entire time of signalling, but only a very small fraction of the same, it is sufficient, in the first analysis, for the receiver that is intended to receive the signals to remain unblocked only during the time that is necessary.

Since parasites (strays) are distributed haphazardly in time, the probability of their being able to "enter" the receiver becomes all the less the longer the latter is blocked. The transmitted impulses can be made unintelligible by intentional jammers. If such jammers utilize continuous waves, their amplitude is relatively low and the energy that manages to enter the receiver is very small. If jamming impulses are used, they are troublesome only when they are synchronous with the useful impulses.

In this latter case, provision is made for getting rid of the jamming impulses by changing the rhythm of the useful impulses exactly like changing a code.

The operator at the receiving station may receive instructions to the effect that, if the modulation is disturbed on a certain cadence of impulses, he is to use some other cadence or cadences taken successively from a series fixed in advance and to which the sender will adjust himself as soon as he is informed of the existence of intentional jamming.

From the viewpoint of reception one drawback of impulse modulation proceeds from the fact that the receiver has to be quite highly damped for the amplitude of the signal to be able to attain its maximum value in it during the duration of the impulse. If an attempt is made to make the impulses ever shorter, which appears advantageous at least from the viewpoint of the mean power utilized, it is necessary to have a receiver with a pass band that is ever wider. This leads to the use of a receiver that is not very selective and that consequently permits passage of the parasites; it is, therefore, necessary for the receiver to be maintained blocked as long as possible.

It is an object of this invention to provide a system which will respond substantially only to impulses spaced apart within predetermined limits.

The invention consists mainly in providing an impulse modulation transmission system that comprises on the one hand a transmitter that is adapted to transmit continuously groups of two impulses in regular spacing, means being provided so that all the spacing in time of the two impulses that form each group will vary in conformity with the sending rhythm of the signals and a receiver responsive to pulses of the desired spacing.

During a signal transmission (working) period, the spacing in time of the two impulses that form each group is equal to $t$.

During a period without signal transmission (rest or silence), this spacing in time becomes $$\frac{t}{n}$$

i. e. $t$ divided by a given factor of sub-division, $n$.

As a rule, the interval between the first impulses of two consecutive groups is constant and is equal to $nt$ where $(n=2)$.

A system of this kind has the following special advantages:

(a) The power required from the transmitter remains constant during idle periods as well as when sending a message, (b) The emission received by an ordinary receiver consists of a continuous crackling and is practically undecipherable.

One example of an embodiment of the invention is described hereunder with reference to the appended drawings, in which:

Fig. 2 illustrates a series of diagrams used in explaining the operation of the system in accordance with the inventions; and Fig. 3 illustrates schematically a receiver according to the invention.

Figure 1:
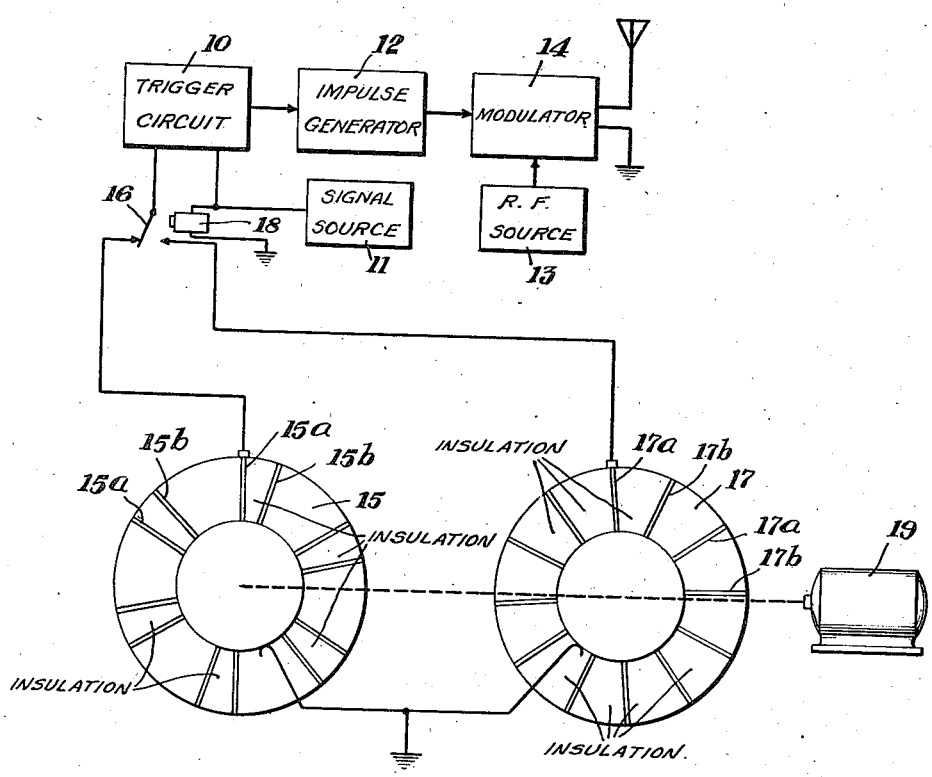
Fig. 1 illustrates a transmitter suitable to perform in accordance with my invention.

In Fig. 1 is shown a trigger circuit 10, the period of which may be varied in accordance with signals applied from source 11. The substantially rectangular waves are applied to impulse generator 12, which may be of any known type, such as a differentiating circuit, for example, to produce spaced impulses defining the leading and trailing edges of the waves applied from trigger circuit 10. These impulses are applied to modulator 14 simultaneously with R. F. energy from source 13 to provide impulses for transmission. The circuit so far described is a conventional form of time displaced impulse transmitter and may be modified in any manner known in the art. In this conventional transmitter the period between the impulses transmitted would be constant or substantially so during periods of signal transmission and periods of rest, since the time displacement due to modulation is small relative to the spacing between impulses. As a consequence the signal might be quite easily simulated for jamming purposes. Furthermore, the receiver would be opened for reception of noise periodically even if signals are not being transmitted.

According to my invention, I provide a system in which the average impulse spacing between pairs of impulses for no signal condition is different from the average impulse spacing between pairs of impulses under conditions of signal transmission. Under conditions of no signals, no signal control disc 15 is connected by switch 16 to trigger circuit 10. This disc is provided with contacts 15a, 15b to control the trigger circuit to produce the desired width of rectangular wave and hence the impulse spacing. During signalling periods switch 16 is moved to connect signal period control disc 17 to trigger circuit 10 to provide normally different width rectangular waves in trigger circuit 10 by means of contacts. It should be understood that the period of trigger circuit operation remains constant under both conditions, and only the useful part of the rectangular wave varies in width. The operation of switch 16 may be manually controlled, or controlled by means of voice operated relay 18 to connect control circuit 17 to trigger circuit 10 whenever signals are to be sent. A constant speed motor 19 may be provided to drive discs 15 and 17. Other means known in the art may be used, if desired to control the trigger circuit for producing the different width pulses, the illustration being given merely by way of example.

The first graph (1) of Fig. 2 shows the series of regularly spaced impulses $P_1, P'_1, P_2, P'_2, P_3, P'_3$, which are transmitted continuously by the transmitter when there are no signals. When it is desired to transmit a signal for any period of time, the transmitter is adapted to shift the time position of these pairs of impulses in such a way that two consecutive impulses are normally spaced distances of $t$. The second graph (2) in Fig. 2 shows the corresponding impulses $P_1t, P'_1t, P_2t, P'_2t, P_3t, P'_3t$.

Graphs 3, 4 and 5 (Fig. 2) will be utilized in the description of Fig. 3 that represents a receiving station which makes use of the features of the invention and in which the usual high frequency and intermediate frequency stages are only shown generally at 20.

This receiver, on which the received signals are applied at S, comprises an oscillator OSC which produces a control wave either of sinusoidal shape as shown at 3 or 4 (Fig. 2) or of square shape as shown at 5, and having a frequency of $$f = \frac{1}{t}$$

This oscillator is synchronized by the received impulses as indicated by line 21 leading from synchronizer S, and its phase is adjusted in such a way that it is located at (3) and (5), as shown in Fig. 2, with respect to the signalling impulses, i. e. the auxiliary voltage passes substantially through its maximum amplitude at the moment of arrival of the first impulse of each group. Arrangements whereby an oscillator is controlled or synchronized by signals having a definite frequency and coming from a distinct transmitter, are well known in the art. Such devices are employed especially in the television art, where line frequency and image frequency are very frequently re-constituted by a local oscillator, synchronized under the control of signals having a predetermined frequency and transmitted especially for this purpose. Since such devices may assume a large number of forms and since they are very well known in the art, it is thought needless to encumber the instant application with details of such arrangements. Therefore an arrangement of this type is indicated by the block element carrying the legend S. It may happen during a period of silence, during which the impulses are spaced by $t/2$, that the oscillator becomes synchronized to the second impulse of the group. Under these conditions, the auxiliary voltages take on a phase like that shown at 4 with respect to the signalling impulses.

The oscillations produced by the local oscillator OSC and the received signals are applied, as shown in Fig. 3, to two tubes V and V' which are shown as triodes but which may be of any other suitable type, and they have their plates fed by sources of high voltage HT over suitable impedances Z and Z'. The output of tubes V and V' is applied to two rectifier tubes D and D' associated, as shown in the drawing, with two amplifier tubes $V_1$ and $V'_1$ which feed a bridge composed of resistances $R_3, R_4, R'_4$. The mode of operation of the device of Fig. 3 is then as follows:

The auxiliary voltage is applied to tubes V and V' in such a way that the cathode is alternately brought to a potential sufficiently high for causing the blocking of the received signals. The voltages to be detected of the received signals are applied simultaneously to the control grids of tubes V and V'.

It can readily be seen that in the case when no signal is transmitted, i. e. in the case when groups of two impulses spaced by $t/2$ are received continuously by the receiver, equal voltages are applied to the grids of tubes $V_1$ and $V'_1$ and no current passes into the resistance $R_3$ that connects the plates of tubes $V_1$ and $V'_1$.

On the other hand, in the case when a signal is transmitted, i. e. in the case when the distance between the two impulses of each group is $t$, it can be seen that only one of the tubes V or $V_1$ operates and that, as a result of the unbalance caused, a current passes into resistance $R_3$.

As the spacing of the impulses varies slightly during reception due to modulation the amplitude of the output current also varies and the signal envelope is thus reproduced. The envelope is applied to the receiver output circuit 22 which may be any desired reproducing apparatus.

Since parasites are distributed haphazardly, they will pass, as a rule, along one path (tube V) as well as the other (tube V'), and if the time constant of circuits $CR_2, CR'_2$ is suitable, the current in R will be relatively very weak. It will be the same in the case when an intentional jumbler is received that is not synchronized with the useful impulses that it is desired to detect.

The invention can be utilized in embodiments other than those shown and described, as explained.

What is claimed is:

1. A method of signalling by means of transmitted pairs of impulses which are time displaced with respect to one another in accordance with signal modulations, which comprises giving to said impulses a first predetermined spacing when signals are being transmitted, alternating said spacing in accordance with signal modulations while maintaining substantially the average of said first spacing, and giving to said impulses a second predetermined spacing harmonically related to said first spacing when no signals are being transmitted.

2. A method of signalling according to claim 1 further comprising receiving said transmitted impulses, distinguishing between said received pulses in accordance with said first and second spacings, and reproducing said signals from said distinguished pulses of substantially said first spacing.

3. A receiver for discriminating between pairs of received impulses having a first predetermined average time spacing and impulses having a second time spacing harmonically related to said first spacing, comprising an oscillation generator producing control waves having voltage peaks of the same polarity spaced apart by said first predetermined spacing, and voltage peaks of opposite polarity spaced apart by said second predetermined spacing, a pair of tube circuits, means for rendering said circuits alternately effective under the influence of opposite peaks of said control wave, means for simultaneously applying said received impulses to said tube circuits, whereby impulses of said first spacing pass only one of said circuits and impulses of said second spacing pass both of said circuits, and balanced means in the output of said tube circuits for balancing out such impulses as pass both of said circuits, whereby only said impulses having said first predetermined average spacing are effective.

4. A receiver according to claim 3, wherein said second spacing is one-half said first average spacing, and in which said oscillation generator has a frequency such that one period of oscillation occurs in the time interval of said second spacing.

5. A receiver according to claim 3, wherein said tube circuits include grid controlled vacuum tubes, rectifier tubes in the output of said vacuum tubes, and smoothing filters in the output of said rectifiers and said balanced means comprises a second pair of vacuum tubes for receiving energy from said respective smoothing filters and resistance arms connected with said second vacuum tubes.

6. A receiver according to claim 3, wherein said balanced means comprises a bridge circuit further comprising means coupled across said bridge circuit for deriving a signal indication from the impulses passing said bridge circuit.

7. A transmission system in which signals are indicated by the relative time displacement of pairs of impulses, including means for transmitting said impulses with a first predetermined average time displacement during the transmission of signals, and means for transmitting said impulses with a different second time displacement during periods of no signal, said last named means comprising means for assuring that said second time displacement is a predetermined sub-multiple of said first time displacement.

8. A transmission system in which signals are indicated by the relative time displacement of pairs of impulses, including means for transmitting said impulses with a first predetermined average time displacement during the transmission of signals, and means for transmitting said impulses with a different second time displacement during periods of no signal, said system further including a receiver means for receiving said transmitted impulses and means for discriminating between said impulses according to said first and second time displacement.

ROBERT G. TAHON.

REFERENCES CITED

The following references are of record in the file of this patent:

UNITED STATES PATENTS

| Number | Name | Date |
| --- | --- | --- |
| 2,199,634 | Koch | May 7, 1940 |
| 1,869,659 | Broertjes | Aug. 2, 1932 |
| 1,634,390 | Zworykin | July 5, 1927 |